United States Patent [19]
Decker et al.

[11] Patent Number: 5,419,875
[45] Date of Patent: May 30, 1995

[54] GAS GENERATOR WITH NOVEL NOZZLE STRUCTURE

[75] Inventors: Hans Joachim Decker, Wiesbaden; Hans U. Freund, Bad Homburg; Karl-Heinz Grünthaler, Usingen; Helmut Heide, Kelkheim; Klaus Hollenberg, Bad Homburg; Hubert Preis, Darmstadt; Karl J. Rowold, Friedrichsdorf; Ralf G. Tschulena, Wehrheim, all of Germany

[73] Assignee: Daicel Chemical Industries, Ltd., Tokyo, Japan

[21] Appl. No.: 210,261

[22] Filed: Mar. 18, 1994

Related U.S. Application Data

[63] Continuation of Ser. No. 865,369, Apr. 8, 1992, abandoned.

[51] Int. Cl.$^6$ ............................................. B01J 8/02
[52] U.S. Cl. ........................... 422/166; 422/167; 422/305; 280/736
[58] Field of Search ............... 422/165, 166, 167, 305; 102/530, 531; 280/736, 740, 741, 742

[56] References Cited

U.S. PATENT DOCUMENTS

| | | | |
|---|---|---|---|
| 3,532,360 | 10/1970 | Leising et al. | 280/150 |
| 3,618,980 | 11/1971 | Leising et al. | 280/150 |
| 3,632,132 | 1/1972 | Haas | 280/150 |
| 3,985,076 | 10/1976 | Schneiter | 102/39 |
| 4,131,299 | 12/1978 | Ono et al. | 280/736 |
| 4,137,847 | 2/1979 | Osborne | 280/741 |
| 4,278,638 | 7/1981 | Nilsson et al. | 422/166 |
| 4,296,084 | 10/1981 | Adams et al. | 423/151 |
| 4,530,516 | 7/1985 | Adams et al. | 280/741 |
| 4,547,342 | 10/1985 | Adams et al. | 422/166 |
| 4,561,675 | 12/1985 | Adams et al. | 280/734 |
| 4,578,247 | 5/1986 | Bolleau | 422/165 |
| 4,590,041 | 5/1986 | Hill | 422/165 |
| 4,722,551 | 2/1988 | Adams | 280/736 |
| 4,943,086 | 7/1990 | Cunningham | 280/741 |
| 5,106,119 | 4/1992 | Swann et al. | 280/736 |

FOREIGN PATENT DOCUMENTS

| | | | |
|---|---|---|---|
| 47-30045 | 11/1972 | Japan . | |
| 50-16057 | 6/1975 | Japan . | |
| 63-301144 | 12/1988 | Japan . | |
| 0045239 | 2/1990 | Japan | 280/736 |

Primary Examiner—Timothy M. McMahon
Attorney, Agent, or Firm—Weingram & Zall

[57] ABSTRACT

A gas generator for air bags is provided which includes a first outer shell and a second outer shell, each having a circular part and an outer wall formed along the outer periphery of the circular part. A gas generating device is installed in the hollow portion formed within the outer shells. Openings for communicating the hollow portion with an air bag are provided. A plurality of concentric wall members axially extending from the circular part of the first outer shell and a plurality of concentric wall members axially extending from the circular part of the second outer shell, located at positions corresponding to the outer wall members of the first outer shell define circumferential chambers within the gas generator. Gaps are formed between terminal end surfaces of opposing outer wall members whereby gases produced by the gas generating device on receiving impacts flow through the generator and are introduced into the air bag to protect a passenger from impacts.

19 Claims, 2 Drawing Sheets

GAS GENERATOR WITH NOVEL NOZZLE STRUCTURE

This is a continuation of application Ser. No. 07/865,369 filed on Apr. 8, 1992, now abandoned.

BACKGROUND OF THE INVENTION

1. Field of the Invention

The present invention relates to a gas generator for air bags that protect passengers from impacts and more particularly to a novel structure for a gas generator.

2. Prior Art

Conventional gas generators for air bags have nozzles formed between adjacent chambers to introduce flames of a transfer charge from an igniter chamber into a combustion chamber or to introduce gases produced by a gas generant in the combustion chamber into a coolant/filter chamber.

Conventional gas generators require that holes be drilled to form nozzles between chambers, thus, it takes much effort and many man hours to manufacture the generators. Further, burrs may occur at the drilled holes, which must be further machined to provide the desired nozzle. Moreover, the operation of a drill may be restricted by the location of holes. None of the previous patents, taken either singly or in combination, are thought to teach or suggest the benefits of the present invention.

U.S. Pat. No. 3,532,360 to Leising, et al, discloses a gas generating apparatus having a housing, a gas generating section, a coolant chamber, and inflatable air bag. The housing is generally bowl shaped and includes a bottom wall and a side wall. The gas generator is separated from an air bag by a plate having holes extending therethrough and a diaphragm which ruptures under pressure when the gas generant begins burning. The burning mixture is propelled into the air bag and continues to burn to achieve full inflation of the bag.

U.S. Pat. No. 3,618,980 to Leising, et al, discloses a gas generator having an ignitable propellant and a bag adapted to be inflated by gas released from the propellant. Also included is a trapping device for inhibiting movement of burning propellant from the gas generator to the interior of the bag. The trapping device includes a deflector which directs the propellant toward veins. The veins direct the materials towards the walls of the chamber in which they are positioned, causing the materials to travel in a generally circular pass, thereby enhancing combustion of the propellant. Because of their mass and velocity, reacting particles are kept in the chamber until fully consumed. A gas generator is contained in two housings that are connected together by plurality of fasteners.

U.S. Pat. No. 3,632,133 to Hass, discloses an inflatable air bag that includes a gas generator which, upon ignition, produces a high velocity gas stream directed into the converging end of a converging-diverging nozzle and then into the inflatable air bag. The high velocity stream of gas also influences the drawing of gas from the exterior of the gas generator into the air bag.

U.S. Pat. No. 3,985,076 to Schneiter et al, discloses a gas generator having an inner housing and an outer housing forming an annular chamber, having a central ignition means surrounded by a gas generant composition. The inner housing has a plurality of peripheral orifices. The inner housing is threadably engaged with the outer housing. The gas generant is surrounded by a diaphragm which is ruptured upon ignition. The resulting gases are then passed through a filter for solid particles, then through a pH neutralizing material and cooling device before being expelled into an inflatable structure.

U.S. Pat. No. 4,296,084 to Adams et al, discloses a method and apparatus for gas generation comprising a housing comprising an upper convex half shell threadably attached to a lower concave half shell. Within the housing is a combustion chamber having a gas generant, an igniter, a primary filter means in the combustion chamber comprised of a woven fabric which swells and becomes tacky at the temperature of the combustion process to retard the outflow from the combustion chamber of combustible products, and a secondary filter located outside of the combustion chamber.

U.S. Pat. No. 4,278,638 to Nilsson, et al, discloses a gas generator construction having a housing with a central tubular housing part which contains an ignition device, surrounded by a reaction chamber containing a gas generant, surrounded by a filter. The device includes a S-shaped wall member forming part of the reaction chamber, having an aperture through which gases flow to the expansion chamber.

U.S. Pat. No. 4,530,516 to Adams, et al, discloses a gas generator for use with an inflatable air bag comprising an upper shell and a lower shell welded together and an elongated steel center-tie member rigidly attached through the center of the housing having a hollow cylindrical perforated body containing an igniter charge assembly. Surrounding the center-tie member is an annular chamber containing a gas generant. After combustion of the gas generant, gases flow circumferentially through a screen filter and through a diffuser screen assembly, through exit ports of the housing into the air bag.

U.S. Pat. No. 4,547,342 to Adams, et al, discloses a gas generator for use with an inflatable air bag comprising a housing having an upper shell and a lower shell welded together. Within the housing are three integrally formed concentric cylinders defining chambers. A gas generant is contained in the combustion chamber. Upon ignition of the gas generant, gases flow through an inner screen filter pack radially outward through a combustion chamber exit where they are turned downward by a deflector ring where they strike flashing and then flow radially outward between the deflector ring and an outer screen pack, through the outer screen pack and finally exit port holes in the housing.

U.S. Pat. No. 4,578,247 to Bolleau, discloses a gas generator comprising a housing having two subassemblies each having first and second concentric cylinders joined together by welding to form an igniter chamber and an outer chamber. The outer chamber is divided into three axial chambers, the first of which contains a fuel and the second and third chambers cooling and filtering means.

U.S. Pat. No. 4,590,041 to Hill, discloses a gas generator wherein gas generant pellets are maintained under pressure to improve the duration stability and decrease the degradation of the gas generant pellets. Pressure is applied by a plate that is spring biased against the pellets.

U.S. Pat. No. 4,943,086 to Cunningham, discloses a gas generator having a housing comprising an inner shell welded to an outer shell. Within the housing defined by the shells is an inner combustion chamber in the outer diffuser chamber. The igniter material is contained within a container that is free of attachment to any structural component of the housing, thereby permitting a greater number of apertures to be provided therein or a more diffused pattern of gas flow into the combustion chamber. This eliminates the need for an ignition cup for the igniter powder as the squib may fire directly into the igniter powder and insure greater ignition thereof.

Japanese Patent No. JP 63-301144 to Mizoguchi, discloses a structure of an air bag comprising a lattice configuration or a multiple pillar-shaped configuration so that less air is required for inflation of the air bag.

Japanese Patent No. JP 47-30045 to Kogyo, discloses a rapidly inflatable apparatus for shock absorption comprised of a series of tube-like inflators linked together by a piece of material which accepts an accelerated body after a collision.

Japanese Patent No. JP 50-16057 to Toyota Motor Corporation, discloses an air bag having inner and outer films joined by blocked connecting portions which take on a lattice or wave-like shape to maintain the shape of the bag.

OBJECTS AND SUMMARY OF THE INVENTION

The gas generator for air bags according to this invention comprises: a first outer shell and a second outer shell, each having a circular part and an outer wall, the outer wall formed along the outer periphery of the circular part; a gas generating device installed in a hollow portion formed within the outer shells; openings for communicating the hollow portion with an air bag; a plurality of concentric outer wall members axially extending from the circular part of the first outer shell; a plurality of concentric outer wall members axially extending from the circular part of the second outer shell and located at positions corresponding to the outer wall members of the first outer shell; chambers circumferentially defined by the outer wall members of the first outer shell and by the outer wall members of the second outer shell opposing those of the first outer shell; and gaps formed between terminal end surfaces of the opposing outer wall members; whereby gases produced by the gas generating device on receiving impacts are introduced into the air bag to protect a passenger from the impacts.

The wall members formed on the first outer shell and the wall members on the second outer shell opposing those of the first outer shell cooperate to define chambers in the circumferential direction. The opposing wall members have gaps between the terminal end surfaces thereof which form passages or nozzles between the chambers. Chambers thereby communicate with each other.

The structure of this invention is simple, making the manufacture of the gas generator easy. It is also possible to form the gaps at any position by simply changing the axial length of the outer wall members.

It is therefore an object of this invention to provide a gas generator for air bags that eliminates the problems associated with drilling in the prior art.

It is another object of this invention to eliminate hole-drilled nozzles by forming nozzles automatically by joining shells.

It is still another object of this invention to provide a gas generator which results in reduced efforts and man hours, and therefore the cost, in connection with the manufacture of the gas generator.

It is even another object of this invention to eliminate the step of removing the burrs in the process of manufacturing gas generators.

Still another object of this invention is to provide a gas generator having a reduced number of welds needed to produce a final product.

BRIEF DESCRIPTION OF THE DRAWINGS

These and further objects of the present invention will become apparent to those skilled in the art from review of the following Detailed Description of the Invention and accompanying drawings in which.

DETAILED DESCRIPTION OF THE INVENTION

Figure 1:
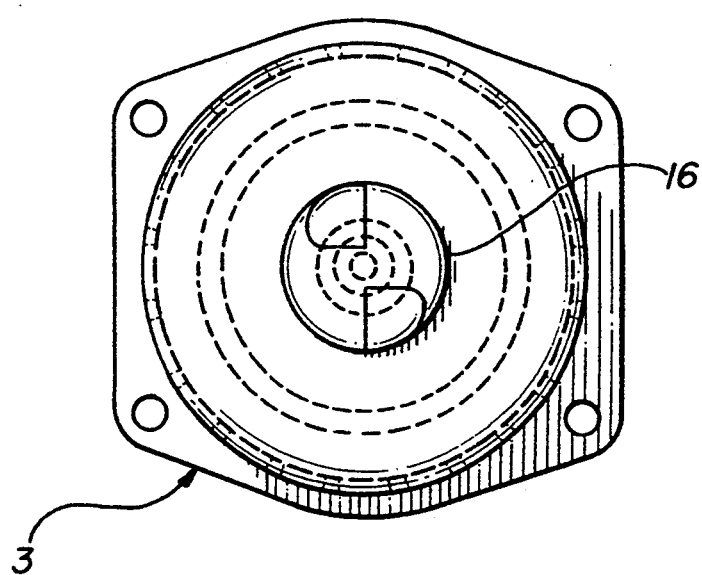
FIG. 1 is a bottom plan view of a gas generator of the present invention.
Figure 2:
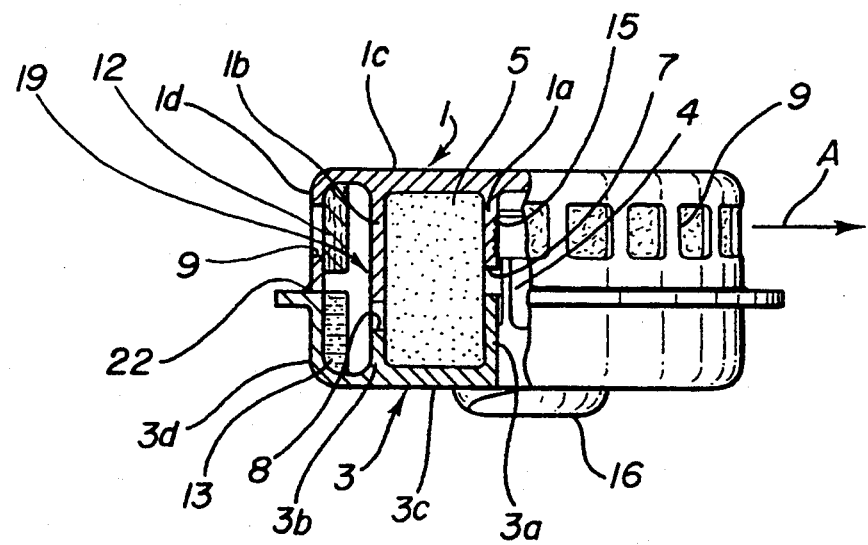
FIG. 2 is a semi cross-sectional view of a gas generator of FIG. 1.

Referring generally to FIGS. 1 and 2, the housing of the gas generator of the present invention comprises a first outer shell or diffuser shell 1 and a second outer shell or closure shell 3. These outer shells are made of any appropriate material, in any appropriate manner, though aluminum die cast has been particularly successful. The diffuser shell 1 and the closure shell 3 each comprise a circular part 1c, 3c respectively and an outer wall 1d, 3d respectively, formed around the periphery of the circular part.

The diffuser shell 1 has a center tube 1a and formed at the center of and integral with the circular part 1c, which extends in the axial direction until its terminal end is near the center of the housing. The closure shell 3 has a center tube 3a formed at the center of and integral with the circular part 3c that extends in the axial direction toward the opposing center tube 1a. The center tubes 1a, 3a cooperate to form a circumferentially defined chamber, i.e., an igniter chamber 4. Between the terminal end surfaces of the two center tubes 1a, 3a, a gap or nozzle 7 is formed. The gap 7 is a ring slit in the outer wall along the circumferential direction.

Similarly, wall members 1b and 3b are formed on the circular parts 1c and 3c of diffuser shell 1 and closure shell 3 respectively. The wall members 1b and 3b are arranged concentrically outside the center tubes 1a and 3a. Wall member 1b extends axially past the center tube 1a, while opposing wall member 3b is formed much shorter. Wall members 1b, 3b cooperate to form a combustion chamber 5, with gaps or nozzles 8 formed circumferentially between the terminal end surfaces of the wall members 1b, 3b.

The center tube 1a has a female screw 15 formed on its inner circumferential surface, with which an adapter 16 is threadably engageable. The diffuser shell 1 and the closure shell 3 are fastened together by the adapter 16, the head of which extends beyond the closure shell 3. The diffuser shell, and the closure shell 3 are also secured together by a weld 22 extending along the outer circumference of the housing. The adapter connection and the weld provide a sufficient strength against inner gas pressure build-up in the gas generator.

The interior of the housing is divided in the circumferential direction by the center tubes 1a, 3a and by wall members 1b, 3b to form the igniter chamber 4 within the center tubes, the combustion chamber 5 between the center tubes and the wall members outside it, and the filter chamber 19 surrounding the combustion chamber 5.

The adapter 16 contains a squib and an enhancer (neither of them shown) and the combustion chamber 5 is filled with a gas generant. In the filter chamber 19 are installed a cooler 13 and a filter 12.

Between the igniter chamber 4 and the combustion chamber 5 is formed the gap 7 that introduces the flame of the enhancer (transfer charge) into the combustion chamber 5. The gaps 8 are formed between the combustion chamber 5 and the filter chamber 19 for introducing gases produced in the combustion chamber 5 into the filter chamber 19. Further, between the filter chamber 19 and the air bag (not shown) are formed gas outlets 9, which are openings that allow gases that have passed through the cooler and filter to exit the gas generator into the air bag.

Importantly, the nozzle 7 between the adaptor 16 (containing the squib and the enhancer) and the combustion chamber 5, as well the nozzle 8 between the combustion chamber 5 and the filter chamber 19 are formed by means of forming areas of a reduced axial dimension in the axially extending circumferential walls extending from the diffuser shell 1 and the closure shell 3. The areas of reduced axial dimension may be present on only one of the members extending from either the diffuser shell 1 or the closure shell 3, or such areas may be present on the members extending from both shells. Typically there will be a plurality of nozzles extending about the circumference of the member. The reductions in the axial dimension in the members of either diffuser shell 1 or the closure shell 3 may be periodic or uneven. Also, while the typical shape of the reduced axial dimension would be square to form castellated members, the reduction may occur in various other shaped cross-sections, including that resembling a plurality of semi-circles. Also, it is important to note that rotation of the diffuser shell 1 with respect to the closure shell 3 could, depending upon the shape and position in reductions could alter the size and the positioning of the nozzles.

When a sensor (not shown) is activated by an impact, the squib (igniter) is ignited to fire the transfer charge. The resulting high-pressure, high-temperature flame passes through the gap 7, firing the gas generant in the combustion chamber 5. The gases produced in the combustion chamber 5 now pass through the gaps 8, through the cooler 13 and filter 12 and then through the gas outlets 9 out into the air bag as indicated by the arrow A.

Figure 3:
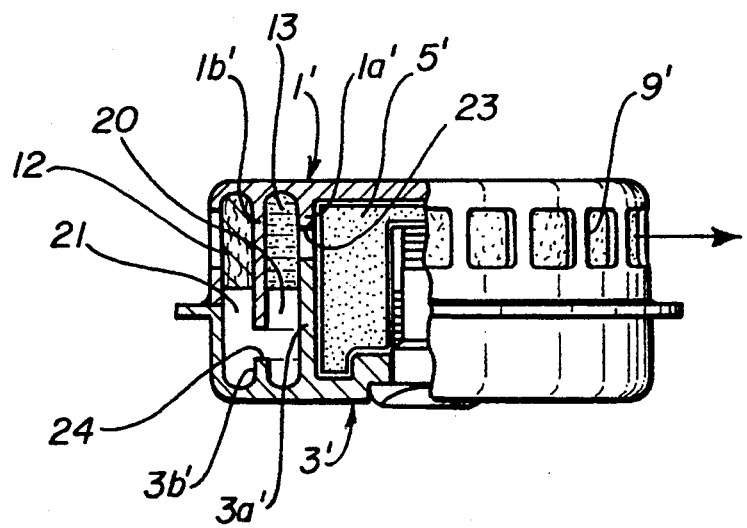
FIG. 3 is a semi cross-sectional view of another embodiment of a gas generator of the present invention.
Figure 4:
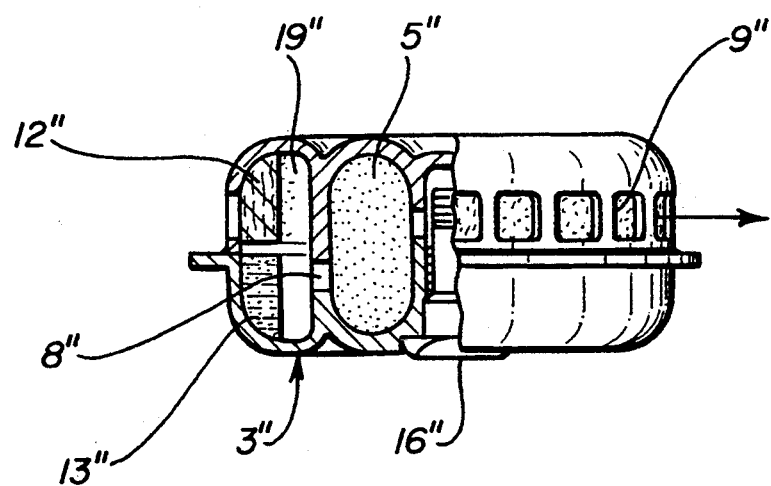
FIG. 4 is a semi cross-sectional view of still another embodiment of a gas generator of the present invention.

FIGS. 3 and 4 show other embodiments of the gas generator of the present invention wherein similar members are represented by similar reference numerals. In FIG. 3, wall members 1a', 3a' define the combustion chamber 5', and wall members 1b', 3b' concentric with the wall members 1a', 3a' divide the filter chamber in two—a cooling chamber 20 and a filter chamber 21. A gap 23 formed between the opposing wall members 1a', 3a' is located close to the diffuser shell 1'. A gap 24 formed between the opposing wall members 1b', 3b' is set close to the closure shell 3'. In this way, a curved gas passage is formed causing the gas to wind as it passes through the gas generator, to decelerate the gas flow, so that the gas is effectively cleaned while it passes through the cooler 13 and the filter 12.

The embodiment of the present invention shown in FIG. 4 is similar to that of FIG. 2 in the structure of the chambers of the gas generator and of the gaps that connect the chambers. However, combustion chamber 5" and filter chamber 19" are formed to be elliptical-like in cross section to improve the internal pressure resistance of the gas generator. Again, the nozzles are formed at locations which cause gas generated to wind through the generator as it leaves the generator. Further, the head of adaptor 16" fits into a recess formed in the closure shell 3" so that mounting the gas generator is made easier.

The adaptor 16 in the gas generator shown in the embodiments of FIGS. 3 and 4 is manufactured as part of the closure shell 3. Also, in these embodiments, the adaptor includes a female screw threaded section. Note, that the adaptor depicted in FIGS. 3 and 4 could be used in connection with the embodiment shown in FIG. 2, and likewise the adaptor shown in FIG. 2 could be used in connection with the embodiments shown in FIGS. 3 and 4.

Note that all gaps or nozzles formed between corresponding wall members are designed to control the pressure drop through the different chambers of the gas generator. Therefore, the generator can be designed so that the major pressure drop occurs during the exit of the combustion gas from the combustion chamber and as such, the cooler and filter chambers can be constructed with walls of lesser thickness and weight.

In all embodiments of the present invention, gaps or nozzles are formed automatically by joining the shells having members that extend different axial lengths, so that the hole-drilling process is eliminated, reducing efforts and man hours and therefore the cost. Also, since no burrs are formed, the process of removing the burrs is not needed.

The structure of this invention is simple, making the manufacture of the gas generator easy. It is also possible to form the gaps at any position by simply changing the axial length of the outer wall members.

Further, the outer wall members can be formed integral with the circular parts of the outer shells. Only one welding is needed along the outer circumference of the outer shells to hold the housing together.

It is important to note that placement of the nozzles controls the flow path of the combusted gas through the gas generator to the air bag. While the generators of the prior art have generally linear passage ways for the combusted gas to travel, the gas generator of the present invention involves a labyrinth-like flow path. For example, in the embodiments shown in FIGS. 2 and 4, the combusted gas is directed through nozzle 8, 8" into the filter chamber 19, 19" where it impacts cooler 13, 13", and then flows upward, through filter 12, 12" and out the gas outlet 9,9". Similarly, the embodiment of FIG. 3 requires the combusted gas to travel in a labyrinth-like path as follows: combusted gas leaves from the combustion chamber through the nozzle 23 to cooler 13' in cooler chamber 20, through the cooler down to nozzle 24 between the cooler chamber and the filter chamber, up through filter 12' in filter chamber 21 and out the gas outlet 9'.

Having thus described the invention in detail, it is understood that the foregoing description is not intended to limit the spirit and scope thereof. What is desired to be protected by Letters Patent is set forth in the appended claims.

What is claimed is:

1. A gas generator for air bags comprising:
a first outer shell and a second outer shell, each having a circular part with an outer periphery and an outer wall formed integrally with the circular part along the outer periphery of the circular part;
a gas generating device installed in a hollow portion formed within the first and second outer shells;
openings in at least one of the outer walls of the first and second outer shells for communicating the hollow portion with an air bag;
a first concentric wall member formed integrally with and extending axially from the circular part of said first outer shell, the first wall member having a terminal end surface;
a second concentric wall member formed integrally with and extending axially from the circular part of the second outer shell, the second wall member having a terminal end surface, the second wall member facing the first wall member of the first outer shell;
the terminal end surfaces of opposing first and second wall members having gaps therein, the gaps formed by areas of reduced axial dimension of the wall members;
the first and second concentric wall members coacting to form a concentric partition wall having gaps therein to permit gases produced by the gas generating device to flow through the gas generator to be introduced into an air bag; and
chambers circumferentially defined by the concentric partition wall.

2. The apparatus of claim 1, further including a plurality of first concentric wall members formed integrally with the first outer shell and having terminal end surfaces and a plurality of second concentric wall members formed integrally with the second outer shell and having terminal end surfaces facing the first wall members, the plurality of first and second wall members coacting to form a plurality of concentric partition walls wherein the plurality of concentric partition walls define a plurality of chambers.

3. The apparatus of claim 2, wherein one of the concentric partition walls defines an igniter chamber and another of the concentric partition walls defines a combustion chamber circumferentially disposed about the igniter chamber.

4. The apparatus of claim 3 wherein one of the concentric partition walls define a filter chamber circumferentially disposed about the combustion chamber.

5. The apparatus of claim 3, wherein one of the concentric partition walls define a cooling chamber circumferentially disposed about the combustion chamber.

6. The apparatus of claim 5, wherein one of the concentric partition walls define a filter chamber circumferentially disposed about the cooling chamber.

7. The apparatus of claim 4, wherein the gaps between wall members are formed by areas of reduced axial dimension of the wall members.

8. The apparatus of claim 7, wherein the areas of reduced axial dimension occur periodically about the circumference of the wall members.

9. The apparatus of claim 7 further including an adapter that is engageable with the one of the concentric partition walls extending from the first outer shell, the adapter having a head thereon engaging an outer surface of one of the concentric partition walls of the second outer shell, the adapter securing the first outer shell to the second outer shell.

10. The apparatus of claim 7 further including an adapter that is engageable with one of the concentric partition walls extending from the first outer shell, the adapter having a head thereon engaging an outer surface of the second outer shell, the adapter securing the first outer shell to the second outer shell.

11. A gas generator for air bags comprising:
a first outer shell and a second outer shell each having a circular part;
a gas generating device installed in a hollow portion formed within the first and second outer shells;
openings for communicating the hollow portion with an air bag;
a plurality of first concentric wall members formed integrally with and extending axially from the circular part of said first outer shell, the first concentric wall members having terminal end surfaces; and
a plurality of second concentric wall members formed integrally with and extending axially from the circular part of the second outer shell, the second concentric wall members having terminal end surfaces, the second concentric wall members facing the first concentric wall members of the first outer shell;
the first and second concentric walls coacting to form chambers circumferentially defined by the first and second wall members of the first and second outer shells;
the first and second wall members having gaps formed in the terminal end surfaces thereof, the gaps formed by areas of reduced axial dimensions in the first and second wall members, to communicate the chambers and allow a generated gas to flow through the gas generating device into the air bag.

12. The apparatus of claim 11, wherein the concentric wall members of each outer shell differ in axial length so that a winding flow path for the generated gas is formed.

13. The apparatus of claim 12, wherein the concentric wall members define an igniter chamber.

14. The apparatus of claim 13 wherein the concentric wall members define a combustion chamber circumferentially disposed about the igniter chamber.

15. The apparatus of claim 14, wherein the concentric wall members define a filter chamber circumferentially disposed about the combustion chamber.

16. The apparatus of claim 15, wherein the concentric wall members define a cooling chamber circumferentially disposed about the combustion chamber.

17. The apparatus of claim 16, wherein the concentric wall members define a filter chamber circumferentially disposed about the cooling chamber.

18. The apparatus of claim 17, wherein the gaps between wall members are formed by areas of reduced axial dimension of the wall members.

19. A gas generator for air bags comprising:
a first outer shell cast of a continuous material having a circular part and an outer periphery and at least one concentric wall extending from the circular part;
a second outer shell cast of a material having a circular part, an outer periphery formed integrally with the circular part, and at least concentric wall formed integrally with the circular part and extending from the circular part, the at least one concentric wall formed integrally with the circular part and of the second shell facing the at least one concentric wall of the first shell;

a gas generating device positioned within a housing formed by the first and second shells;

the concentric walls of the first and second outer shells having recesses in terminal end surfaces thereof, the recesses formed by areas of reduced axial dimensions of the concentric walls;

the terminal end surfaces of the concentric walls coacting to form a partition to define chambers within a housing defined by the first and second outer shells, the recesses in the terminal end surfaces coacting to form gaps to permit communication between chambers so that gas produced by the gas generating device may flow through the gas generator to be introduced into an air bag.

* * * * *